(12) United States Patent
Runge

(10) Patent No.: US 10,125,843 B2
(45) Date of Patent: Nov. 13, 2018

(54) HORIZONTAL-MOTION VIBRATION ISOLATOR

(71) Applicant: MINUS K. TECHNOLOGY, INC., Ingelwood, CA (US)

(72) Inventor: Erik Runge, Buellton, CA (US)

(73) Assignee: MINUS K. TECHNOLOGY, INC., Inglewood, CA (US)

(*) Notice: Subject to any disclaimer, the term of this patent is extended or adjusted under 35 U.S.C. 154(b) by 0 days.

(21) Appl. No.: 15/299,122

(22) Filed: Oct. 20, 2016

(65) Prior Publication Data

US 2018/0112737 A1 Apr. 26, 2018

(51) Int. Cl.
*F16F 15/04* (2006.01)
*F16M 11/22* (2006.01)
*F16F 15/073* (2006.01)

(52) U.S. Cl.
CPC .......... *F16F 15/046* (2013.01); *F16F 15/073* (2013.01); *F16F 2236/027* (2013.01)

(58) Field of Classification Search
CPC ..... F16F 15/046; F16F 2232/08; F16M 11/22
USPC .................. 248/581, 638, 619; 267/158, 160
See application file for complete search history.

(56) References Cited

U.S. PATENT DOCUMENTS

| | | | | |
|---|---|---|---|---|
| 3,030,056 A * | 4/1962 | Rogers | ................. | F04B 39/127 248/565 |
| 3,039,725 A * | 6/1962 | Kerley, Jr. | ............. | B60G 11/00 248/570 |
| 4,325,133 A * | 4/1982 | Reitmayer | ............. | G11B 33/08 248/638 |
| 4,736,701 A * | 4/1988 | Kondo | ...................... | B63B 3/70 114/340 |
| 5,178,357 A * | 1/1993 | Platus | ..................... | F16F 3/026 248/619 |
| 5,293,782 A * | 3/1994 | Long | ........................ | B23Q 1/36 248/619 |
| 5,310,157 A * | 5/1994 | Platus | ..................... | F16F 3/026 248/619 |
| 5,370,352 A | 12/1994 | Platus | | |
| 5,530,157 A | 6/1996 | Mewshaw et al. | | |
| 5,549,270 A | 8/1996 | Platus et al. | | |
| 5,669,594 A | 9/1997 | Platus et al. | | |
| 5,833,204 A | 11/1998 | Platus et al. | | |
| 6,498,722 B1 * | 12/2002 | Stolz | ....................... | G06F 1/184 248/634 |
| 8,480,052 B2 * | 7/2013 | Taylor | .................. | F16F 15/067 248/563 |
| 8,662,484 B2 | 3/2014 | Valois | | |

(Continued)

OTHER PUBLICATIONS

International Search Report for PCT International Application PCT/US17/55992 filed Oct. 10, 2017, dated Nov. 3, 2017.

Primary Examiner — Muhammad Ijaz
(74) Attorney, Agent, or Firm — Fulwider Patton LLP

(57) ABSTRACT

A horizontal-motion vibration isolator utilizes a plurality of bent flexures to support an object to be isolated from horizontal motion. Each bent flexure includes a fixed end coupled to a base and a floating end which is cantilevered and coupled to the object being isolated. The arrangement of bent flexures allows the vertical height of the isolator to be reduced without compromising vibration isolation performance. Compressed springs or spring-like elements can be added to bear some of the weight of the object being isolated thus increasing the payload capacity of the isolator.

20 Claims, 7 Drawing Sheets

(56) References Cited

U.S. PATENT DOCUMENTS

| | | | |
|---|---|---|---|
| 9,222,544 B2 * | 12/2015 | Bartel | F16F 15/007 |
| 9,261,155 B2 | 2/2016 | Platus | |
| 9,302,623 B2 * | 4/2016 | Melcher | F16F 7/104 |
| 2008/0292392 A1 * | 11/2008 | Voellmer | F16O 32/02 |
| | | | 403/220 |
| 2018/0112737 A1 * | 4/2018 | Runge | F16F 15/046 |

* cited by examiner

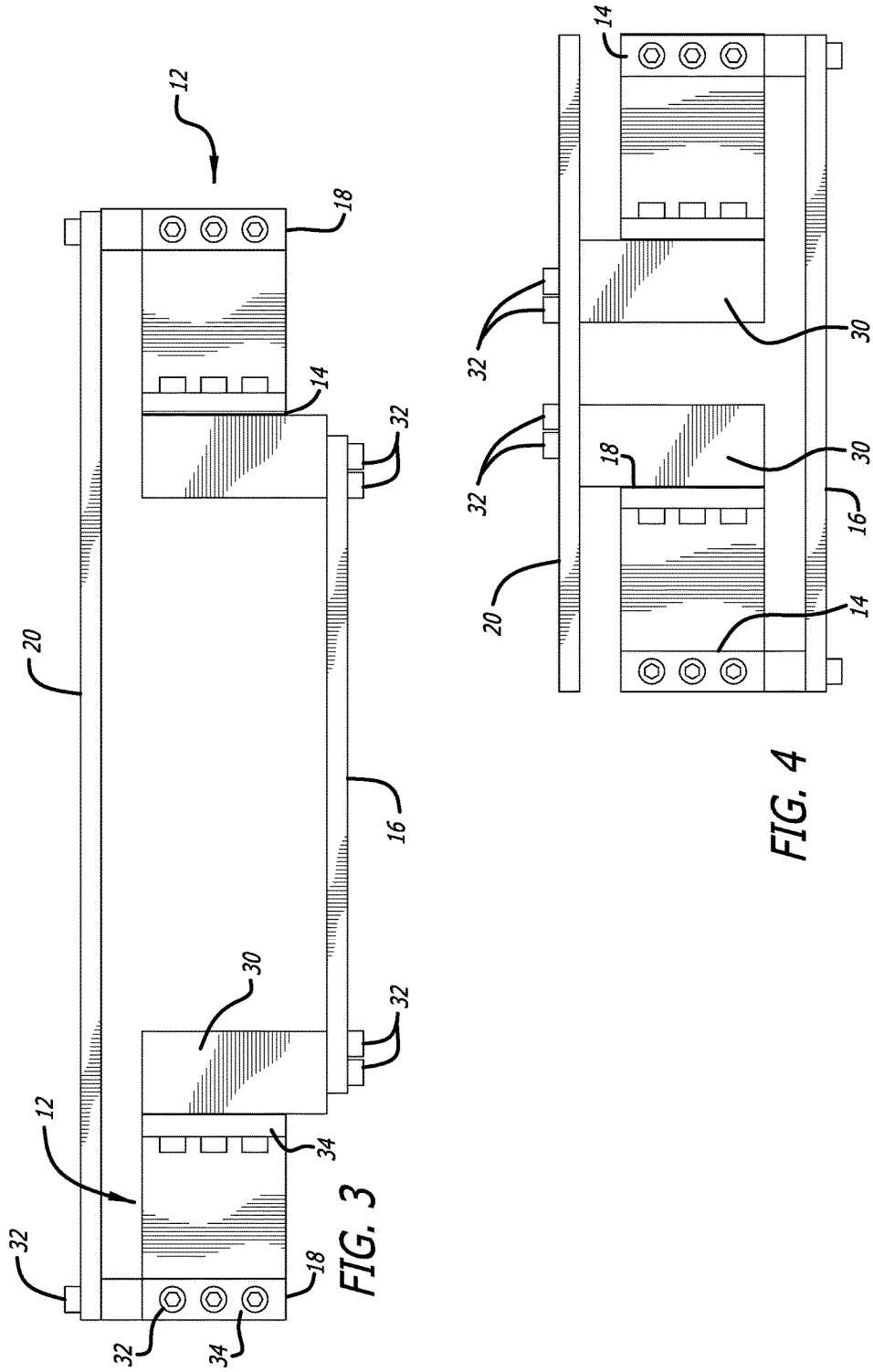

HORIZONTAL-MOTION VIBRATION ISOLATOR

BACKGROUND OF THE INVENTION

The present invention relates generally to suspension systems for isolating and reducing the transmission of vibratory motion between an object or payload and a base and, more particularly, to a compact horizontal-motion vibration isolator and system which can be made lower in vertical height while at the same time making it less sensitive to changes in weight to effectively reduce the transmission of horizontal vibrations between the object and the base. An isolator made in accordance with the present invention provides low frequency isolation and provides high levels of vibration isolation performance while offering a physical form factor that is easy to integrate into instrumentation setups.

The problems caused by unwanted vibration on equipment, devices and processes that are extremely motion sensitive have been widely researched and numerous solutions to prevent or reduce the transmission of vibratory motion have been proposed and developed. Many of the devices designed to reduce the transmission of unwanted vibration between an object and its surroundings, commonly called vibration isolators or suspension devices, have utilized various combinations of elements such as resilient pads made from a variety of materials, various types of mechanical springs, and pneumatic devices. There are, however, shortcomings and disadvantages associated with these particular prior art isolation systems which prevent them from obtaining low system natural frequencies and from limiting internal structural resonant responses to low values while providing high isolation performance at the higher frequencies.

Current methods for horizontal-motion isolation include:

1) Pendulums. These devices support the payload by hanging it from a set of rods or cables. The pendulums, and hence, the mechanical path, must be sufficiently long to achieve a low frequency and tend be fairly complicated.

2) Inverted pendulums, or columns. These can be made short, but exhibit strong sensitivity to payload changes as the critical buckling load is approached. When the columns/inverted pendulums are made shorter in length, the more sensitive they become.

3) Springs. Self-standing and stable springs can be used to support payloads vertically while giving vertical and horizontal isolation. However, it is often difficult to get a stable spring that also has low lateral stiffness.

4) Ball bearing between shallow concave disks. These mechanisms can be made very short, but offer limited performance at low amplitudes as they can be locked by frictional forces if there is not sufficient amplitude to overcome static friction acting on the mechanism.

5) Rubber bellows supporting gimble pistons. These components are found on many air tables used for vibration isolation. However, it is often difficult to obtain low frequencies utilizing these devices since they usually rely on a rubber bellow membrane made stiff by air pressure operating in a shear and rolling manner.

6) Elastomeric pads. These operate much like self-stable, standing springs. However, they cannot achieve low resonant frequencies in a horizontal direction very easily.

These components/methods for effecting horizontal-motion isolation have limitations which the current invention addresses.

Novel vibration isolation systems devices which utilize negative stiffness elements to reduce the stiffness of supporting columns and a support spring are described in U.S. Pat. No. 5,530,157, entitled "Vibration Isolation System" issued May 10, 1994, U.S. Pat. No. 5,370,352, entitled "Damped Vibration System" issued Dec. 6, 1994, U.S. Pat. No. 5,178,357, entitled "Vibration Isolation System" issued Jan. 12, 1993, U.S. Pat. No. 5,549,270, entitled "Vibration Isolation System" issued Aug. 27, 1996, U.S. Pat. No. 5,669,594, entitled "Vibration Isolation System" issued Sep. 23, 1997, U.S. Pat. No. 5,833,204, entitled "Radial Flexures, Beam-Columns and Tilt Isolation for a Vibration Isolation System issued Nov. 10, 1998, and U.S. Pat. No. 9,261,155, entitled improved Vibration Isolation Systems, Serial Number issued Feb. 16, 2016, which are all hereby incorporated by reference in this present application. These vibration isolators exhibit low stiffness, high damping to limit resonant responses of the composite system, effective isolation at the higher frequencies, and can provide high isolator internal structural resonant frequencies.

The particular vibration isolation systems described in these patents provide versatile vibration isolation by exhibiting low stiffness in an axial direction (generally the direction of the payload weight) and any direction substantially transverse to the axial direction (generally a horizontal direction), and may provide tilt or rotation about three mutually perpendicular axes. The present invention, however, is directed only to isolators used to isolate vibratory motion in the horizontal direction. It should be appreciated, however, that the present invention could be connected in series with a vertical-motion isolator and/or a tilt-motion isolator to provide bi-directional or omni-directional isolation as well. In subsequent discussions, an isolator which isolates vibrations in any direction substantially transverse to the direction of the payload will be referred to as a horizontal-motion isolator, and a system using multiple horizontal-motion isolators will be referred to as the horizontal-motion isolation system.

In the embodiments described in the above-noted patents, the isolators rely on a particular principle of loading a particular elastic structure which forms the isolator or a portion of it (the loading being applied by either the supported weight or by an external loading mechanism) to approach the elastic structure's point of elastic instability. This loading to approach the point of elastic instability, also called the "critical buckling load" of the structure, causes a substantial reduction of either the vertical or the horizontal stiffness of the isolator to create an isolation system that has low stiffness in the vertical and in any horizontal direction, and increases the damping inherent in the structure. While stiffness is reduced, these isolators still retain the ability to support the payload weight.

In the event that the load on the elastic structure is greater than the critical buckling load, the excessive load will tend to propel the structure into its buckled shape, creating a "negative-stiffness" or "negative-spring-rate" mechanism. By combining a negative-stiffness mechanism with a spring, adjusted so that the negative stiffness cancels or nearly cancels the positive stiffness of the spring, one obtains a device that can be placed at or near its point of elastic instability. The magnitude of the load causing the negative stiffness can be adjusted, creating an isolator that can be "fine-tuned" to the particular stiffness desired.

These above-described isolators provide excellent devices for isolating or reducing the transmission of vibratory motion between an object and the base. However, the components forming the horizontal-motion isolator are often long beam-columns which are loaded (the loading being applied by the supported weight) to approach the beam-column's point of elastic instability. The vertical length of these support beam-columns can be somewhat large resulting in an isolator that may be too tall for particular vibration isolating applications. It would be particularly beneficial, then, if horizontal-motion isolators could be made in a more compact size and shape which may be more suitable for certain vibration isolation applications. However, while a more compact geometry would be beneficial, it is important that the performance of such horizontal-motion isolators not be compromised. Previous solutions have had a practical limit on how short they can be made without negatively affecting the isolator's payload range. The required height to get low frequency isolation with previous solutions can make them not particularly practical for some applications. The geometry of the horizontal-motion vibration isolator/systems of the present invention is such that it reduces the complexity to achieve low resonant frequencies. Accordingly, the present inventions solve the problems of achieving a horizontal-motion isolator having a low vertical height and provides other beneficial features.

SUMMARY OF THE INVENTION

The present invention improves upon and simplifies existing methods of providing vibration isolation by exhibiting low stiffness in a horizontal direction (generally the direction transverse to the direction of the payload weight). An isolator made in accordance with the present invention can be made much shorter in vertical height than previously possible while allowing for a greater range in payload and also can provide low horizontal natural frequencies. The present inventions provides such features without increasing the sensitivity of the isolator to payload changes.

The horizontal stiffness in the present invention is provided by utilizing bent or curved flexures (herein referred to as "bent flexures") that are cantilevered from a base (or horizontally fixed part of the isolator) and are loaded in shear by the floating ends that support the payload. Both ends of the bent flexures are constrained in such a way to prevent rotation of either end about either horizontal axis. The bent flexures are constrained to move only parallel to vertical planes, X-Z and Y-Z, so they can move in any horizontal direction. The bent flexures will provide low horizontal stiffness and high vertical buckling loads while supporting the payload. The buckling load (the weight at which the bent flexure will no longer be able to support the payload in shear in the vertical direction) of the bent flexures will determine the practical upper limit of the payload range.

In one aspect of the invention, the bent flexures are oriented such that the bends in the material are vertical with respect to the earth. The geometry of the bent flexure allows the flexure to have high vertical stiffness, while still possessing low horizontal stiffness. The bent flexures may be made from suitable structural materials, e.g., plastic, metal, composites, etc. which provide the necessary strength for vertically supporting the payload while still being flexible enough to be loaded to approach the flexures' point of elastic instability. In some aspects of the invention, they can be made of a sheet of material or can be machine out of a solid block of parent material.

The bent flexures are used as, or included as part of, a vibration isolator. In one aspect of the present invention, as few as three bent flexures aligned in parallel may be used to create the horizontal-motion isolator. However, there is no upper limit on the number of bent flexures that may be used in parallel to create the horizontal-motion isolator.

In one aspect of the present invention, the bent flexure can be made having two faces which are at a substantially perpendicular (right angle) with respect to each other. The two faces meet at a bend point (hereinafter referred to as the "bend") which extends along a length of the two faces. Each face of the bent flexure has a vertical length and a horizontal length. The vertical length of the bent flexure will dictate the vertical height of the composite isolator. Accordingly, it would be desirable to maintain the vertical length as small as possible in order to create a horizontal-motion isolator with low vertical height.

In one aspect of the invention, the bent flexure has a minimal radius at the bend, i.e., the faces are at a substantial right angle and have a small radius of curvature. In other aspects, the bent flexure can have a larger, move curved radius at the bend. In yet another aspect of the invention, the bent flexure can have an acute bend radius, i.e., the two faces of the bent flexure are positioned at an acute angle relative to each other. Alternatively, the bent flexure can have an obtuse bend radius in which the two faces are positioned at an obtuse angle relative to each other.

In one aspect of the present invention, the vertical length and horizontal length of each face of the bent flexure can be the same or substantially the same. In another configuration, the horizontal length of one face can be significantly different from the horizontal length of the other face. In yet one particular aspect of the invention, the bent flexure can have an S-shaped configuration having a continuous surface which includes two large radius bends. It should be appreciated that these different variations of the bent flexures may be combined together in creating the composite isolator, i.e., different configurations of the bent flexures could be used together to form the isolator. However, generally, it may be easier to manufacture an isolator using bent flexures having the same size and shape.

In one particular aspect of the present invention, four individual bent flexures are utilized to cooperatively support the payload. In one aspect of the invention, the free or floating ends of the bent flexures can be attached to a top mounting plate which supports the object to be isolated. The fixed ends of the bent flexures can be attached to a base platform which sits on a foundation or ground. Accordingly, the object supported by the top mounting plate can be isolated from the ground via the low horizontal stiffness of the bent flexures. Alternatively, the floating ends of the bent flexures could either be directly attached or otherwise coupled to the object to be isolated.

In another aspect of the present invention, pre-compressed springs or spring-like elements can be added between a base platform (which rests on the ground or foundation) and an upper mounting plate which supports the object to be isolated. Without the payload weight, or with a payload weight smaller than the spring load, the bent flexures are loaded upward in shear. The upward load applied to the bent flexures is limited by the buckling strength of the bent flexures, which is the same for upward load on the flexures or downward load on the flexures. The maximum upward load on the flexures occurs when there is no payload weight.

In this aspect of the invention, the springs or spring-like elements are designed and loaded so that they are near being unstable, right at their instability load, or are unstable so that their horizontal stiffness is small, essentially zero, or is negative, respectively. Also, since the vertical stiffness of the springs or spring-like elements is much lower than that of the bent flexures, the horizontal stiffness of the springs or spring-like elements is not changed by changing the downward load on the system from the payload since any change in load on the system is essentially transmitted to the bent flexures. In other words, the compressed length of the springs or spring-like elements is essentially fixed by the height of the vertically stiff bent flexures so the compression load on the springs or spring-like elements does not change by adding or changing payload weight.

With this aspect of the invention, the addition of compressed springs or spring-like elements to an existing bent-flexure isolation system enables an increased payload by essentially a factor of two and a reduction in the natural frequency of the system. The compression of the springs or spring-like elements and the upward load on the bent flexures without a payload can be essentially that of the payload weight limit of the existing isolation system without the springs or spring-like elements. With the compressed springs or spring-like elements, the original payload limit can be doubled since application of the original payload reduces the upward load on the bent flexures to essentially zero and doubling the original payload loads the flexures downward to the load caused by the original payload without the compressed springs or spring-like elements. With essentially the same horizontal stiffness of the system from the bent flexures and double the payload weight, the natural frequency of the system is now reduced by approximately a factor of 0.7 or one over the square root of two. With the compressed springs or spring-like elements designed to produce negative stiffness, the natural frequency of the system is further reduced.

Alternatively, for a given payload, this embodiment enables a lower height bent-flexure isolation system or a lower natural frequency system of the same height. By using a pre-compression spring or spring-like element load of half the payload weight, the bent flexures can be designed for a lower height to handle the reduced buckling load or a lower stiffness for the same height to reduce the natural frequency. With the compressed springs or spring-like elements designed for negative stiffness, the height or natural frequency can be further reduced.

In this aspect of the invention, conventional coil springs or various spring-like elements can be utilized. Some examples include: rigid post with small springs at the ends; machined springs with rigid post and springs at ends; rigid post with neoprene bearings at ends which could provide added damping.

The geometry of the isolator of the present invention is such that it reduces the complexity of the necessary components to achieve low resonant frequencies. The present invention allows a complete isolator, e.g., vertical, horizontal and/or tilt, or horizontal only, to be made with a lower vertical height than is currently possible with conventional isolators. Accordingly, while the present invention is disclosed as providing horizontal-motion isolation only, it should be appreciated that isolators or components which isolate vertical and/or tilt motion could be incorporated with the horizontal-motion isolator of the present invention to create a composite isolation system having bi-direction or omni-directional vibration isolating capabilities.

The present invention thus provides a more compact horizontal-motion vibration isolator which can be created without compromising vibration isolation performance. Other features and advantages of the present invention will become apparent from the following detailed description when taken in conjunction with the accompanying drawings which illustrate, by way of example, the principles of the present invention.

BRIEF DESCRIPTION OF THE DRAWINGS

FIG. 3 is a side elevational view showing the vibration isolator system of FIG. 1;

FIG. 4 is another side elevational view showing the vibration isolator system of FIG. 1;

DETAILED DESCRIPTION OF THE PREFERRED EMBODIMENTS

Figure 1:
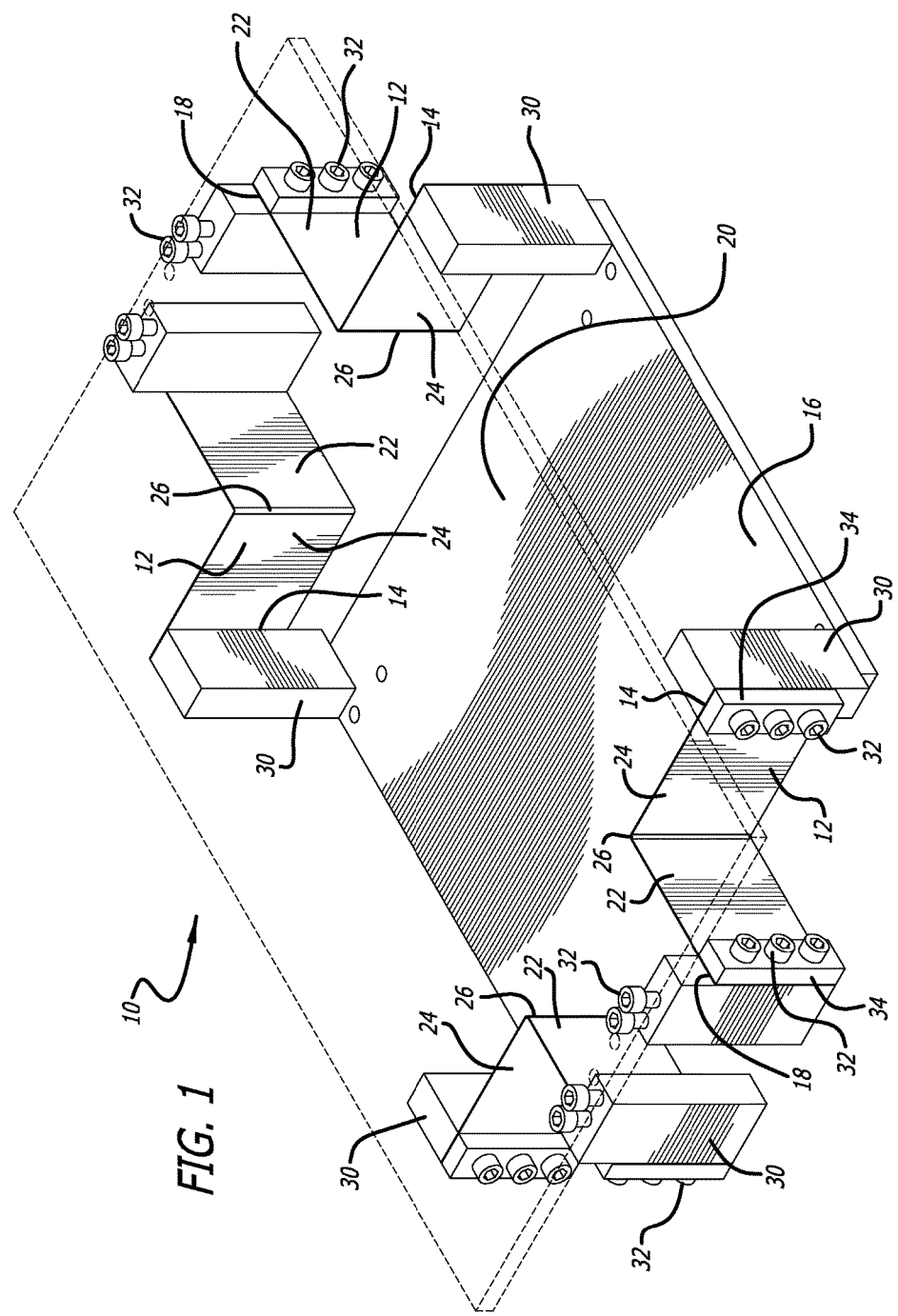
FIG. 1 is a perspective view of one embodiment of a vibration isolating system utilizing four compact horizontal-motion vibration isolators made in accordance with the present invention supporting a mounting plate (shown in dashed lines to better show the underlying components) upon which the object to the isolated may be placed.

FIGS. 1-5 show one embodiment of a compact horizontal-motion isolator 10 made in accordance with the present invention. The embodiment of the horizontal-motion isolator 10 of FIGS. 1-5 is designed to support a payload (not shown) relative to a foundation (base) to reduce the transmission of horizontal vibrations (motion) between the payload and foundation.

The compact horizontal-motion isolator 10 of the present invention includes four support members in the form of bent flexures 12 that cooperatively support the object to be isolated from horizontal vibrations. Each of the bent flexures 12 have a first fixed or stationary end 14 coupled to a base platform 16 and a free or floating end 18 coupled to a top mounting plate 20 (shown in dashed lines in FIG. 1) that can be used in this particular embodiment for supporting the object to be isolated. The base platform 16 can sit on a foundation and may include leveling screws (not shown) used for leveling the base platform 16 relative to the foundation. The geometry of the bent flexure 12 allows the flexure to have high vertical stiffness for supporting the payload, while still possessing low horizontal stiffness for providing vibration isolation. It should be appreciated that while the four bent flexures 12 are shown attached to a base platform in this particular embodiment, it would be possible to attach the bent flexures 12 directly to a particular structure (for example, a vertical isolator) for vibration isolation purposes.

Figure 2:
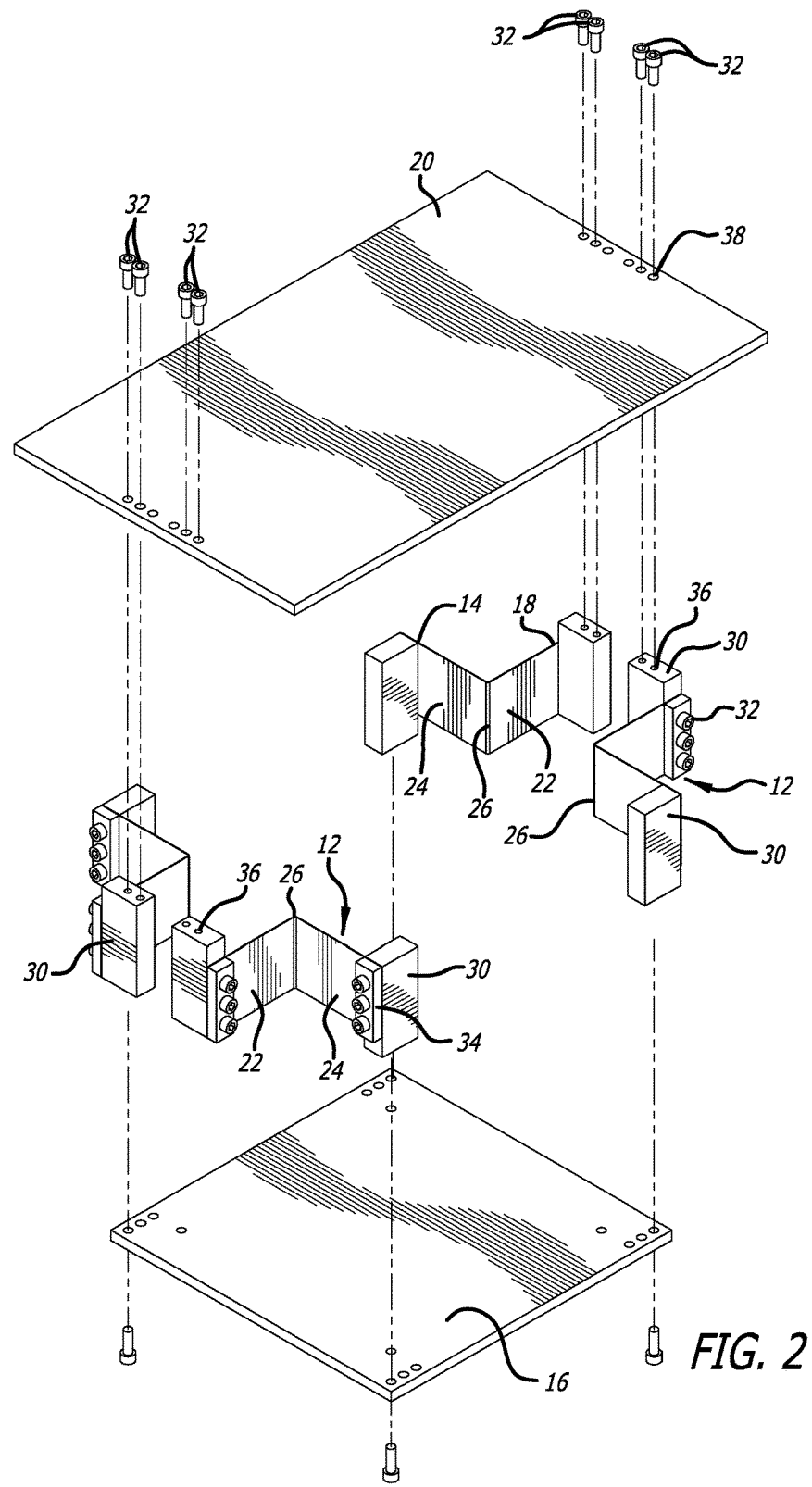
FIG. 2 is an exploded view of the vibration isolation system of FIG. 1.

Each of the bent flexures 12 has a first face 22 and a second face 24 which are joined at a bend 26 that extends along a vertical length of the faces 22, 24. As can best be seen in FIGS. 1, 2 and 5, the first face 22 and second face 24 are substantial perpendicular (at a right angle) to each other. The bend 26 of the bent flexure 12 is shown having a minimal radius forming a sharp bend, as opposed to the larger bend radius of the bent flexure depicted in FIG. 6. Each bent flexure 12 includes one or more mounting openings 28 (see FIGS. 5-7) formed near the stationary end 14 and floating end 18 for mounting purposes. As can be seen in FIGS. 1 and 2, each floating end 18 of the bent flexures 12 is attached to a mounting block 30 which utilizes fasteners, such as screws 32, which extend through the mounting openings 28 formed on the floating end 18. A clamping plate 34 can be placed between the screws 32 and the mounting block 30 to provide additional strength and stability to the assembly. As can be seen in FIGS. 1 and 2, each mounting block 30 includes threaded openings 36 which allow screws 32 to be placed in openings 38 formed on the top mounting plate 18 to securely fasten the mounting plate 20 to each of the mounting blocks 30.

Likewise, each stationary end 14 of the bent flexures 12 is attached to a mounting block 30 which is, in turn, securely fastened to the base platform 16. Screws 32 can be used to secure the stationary end 14 to the mounting block 30 and may include a clamping plate 34 which provides stability to the assembly. Screws or other fasteners can be used to securely fasten the mounting blocks 30 to the base platform 16.

Referring now to FIGS. 3 and 4, the positioning of the bent flexures relative to the base platform 16 is shown. Initially referring to FIG. 3, it can be seen how the bent flexure 12 is mounted above the base platform 16 in a cantilever-style relationship allowing the floating end 18 to support the top mounting plate 20. Each floating end 18 of the bent flexures 12 is cantilevered in this fashion away from the base platform 16. As can be seen in FIG. 4, which shows another end view of the isolator 10 of FIGS. 1 and 2, the floating ends 18 of the bent flexures 12 are connected to the top mounting plate 20 and the stationary ends 14 are mounted to the base platform 16. In FIG. 4, the floating ends 18 extend towards the viewer.

It should be appreciated that the clamping/mounting components disclosed herein are just one of the many ways in which the ends 14, 18 of the bent flexure 12 could be secured to the base platform 16 and top mounting plate 20. Also, while mounting openings 28 are used to clamp the bent flexures 12 to the mounting blocks, such openings may not necessarily be required if an alternative mounting/clamping assembly is utilized.

Figure 5:
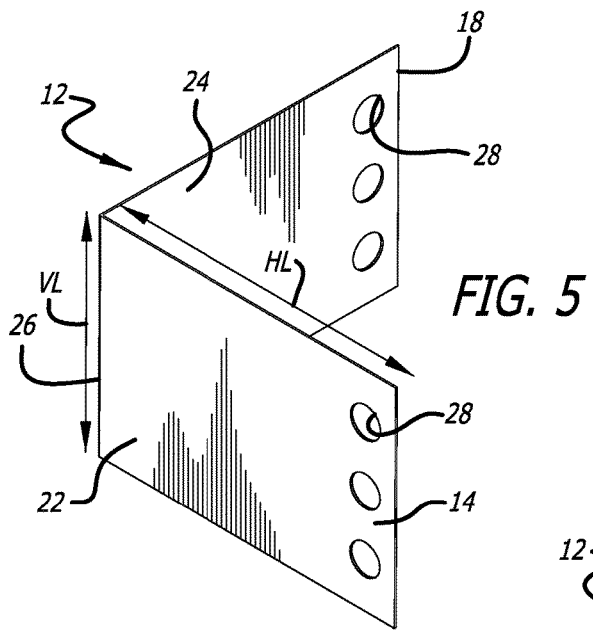
FIG. 5 is a perspective view showing the bent flexure made in accordance with the present invention and depicted in FIGS. 1-4.

The bent flexures 12 depicted in FIGS. 1-5 are shown having two faces 22, 24 which are substantially perpendicular with respect to each other. Referring particularly to FIG. 5, the two faces 22, 24 are shown meeting at the bend 26 which extends vertically (oriented such that the bend 26 is vertical with respect to the earth or the direction of the payload) along the vertical height or length (VL) of the two faces 22, 24. Each bent flexure has a horizontal length (HL). While each face 22, 24 is shown having a horizontal length (HL) which is substantially the same as the other, it should be appreciated that one of the faces could have a longer or shorter horizontal length (HL) than the other.

Figure 6:
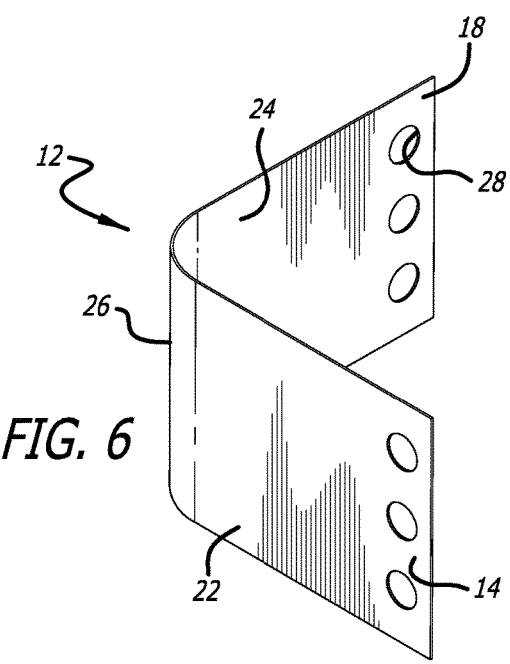
FIG. 6 is a perspective view showing another embodiment of a bent flexure made in accordance with the present invention.

Referring now to FIG. 6, another embodiment of a bent flexure 12 made in accordance with the present invention is shown. As can be seen in this Figure, the bent flexure 12 has a much larger, curved radius at bend 26 than the bent flexure depicted in FIGS. 1-5. In another aspect of the invention, the faces 22, 24 of the bent flexure can be formed at an acute angle (not shown), i.e., the two faces of the bent flexure are positioned to form an acute angle. Alternatively, the faces 22, 24 of the bent flexure 12 can form an obtuse angle (not shown).

Figure 7:
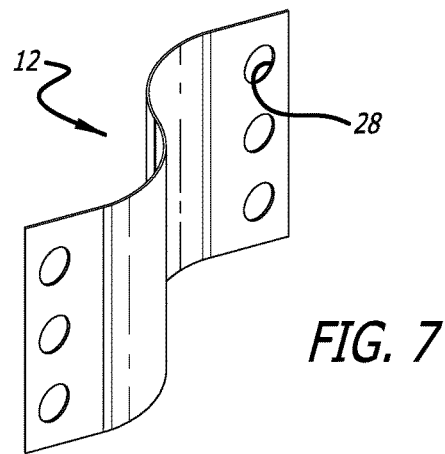
FIG. 7 is a perspective view showing yet another embodiment of a bent flexure made in accordance with the present invention.
Figure 8:
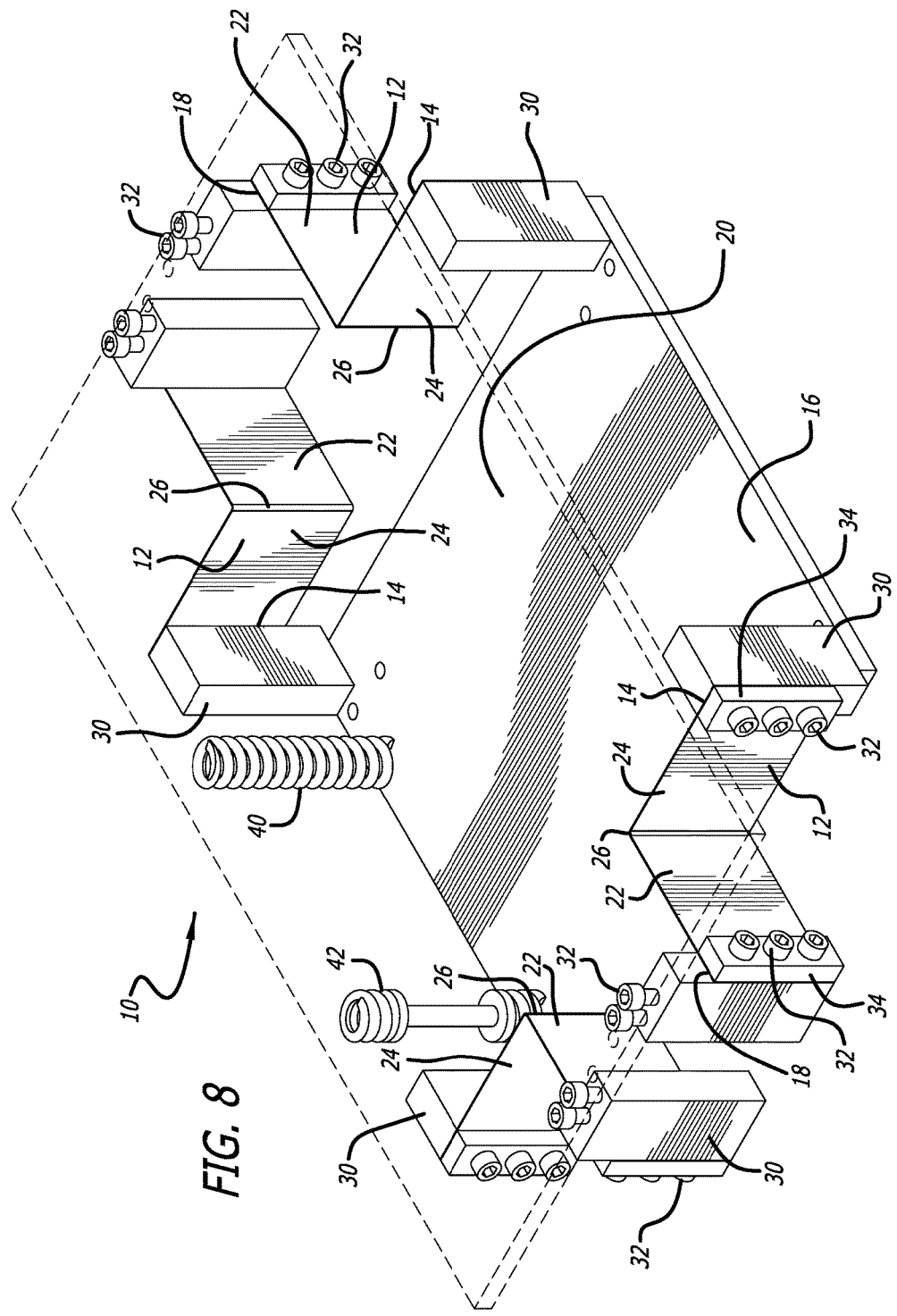
FIG. 8 is a perspective view of another embodiment of a vibration isolating system similar to the one shown in FIGS. 1-4 which includes pre-compressed springs or spring-like elements added between the mounting plate (shown in dashed lines to better show the underlying components) upon which the object to the isolated is placed and a foundation (a base platform)
Figure 9:
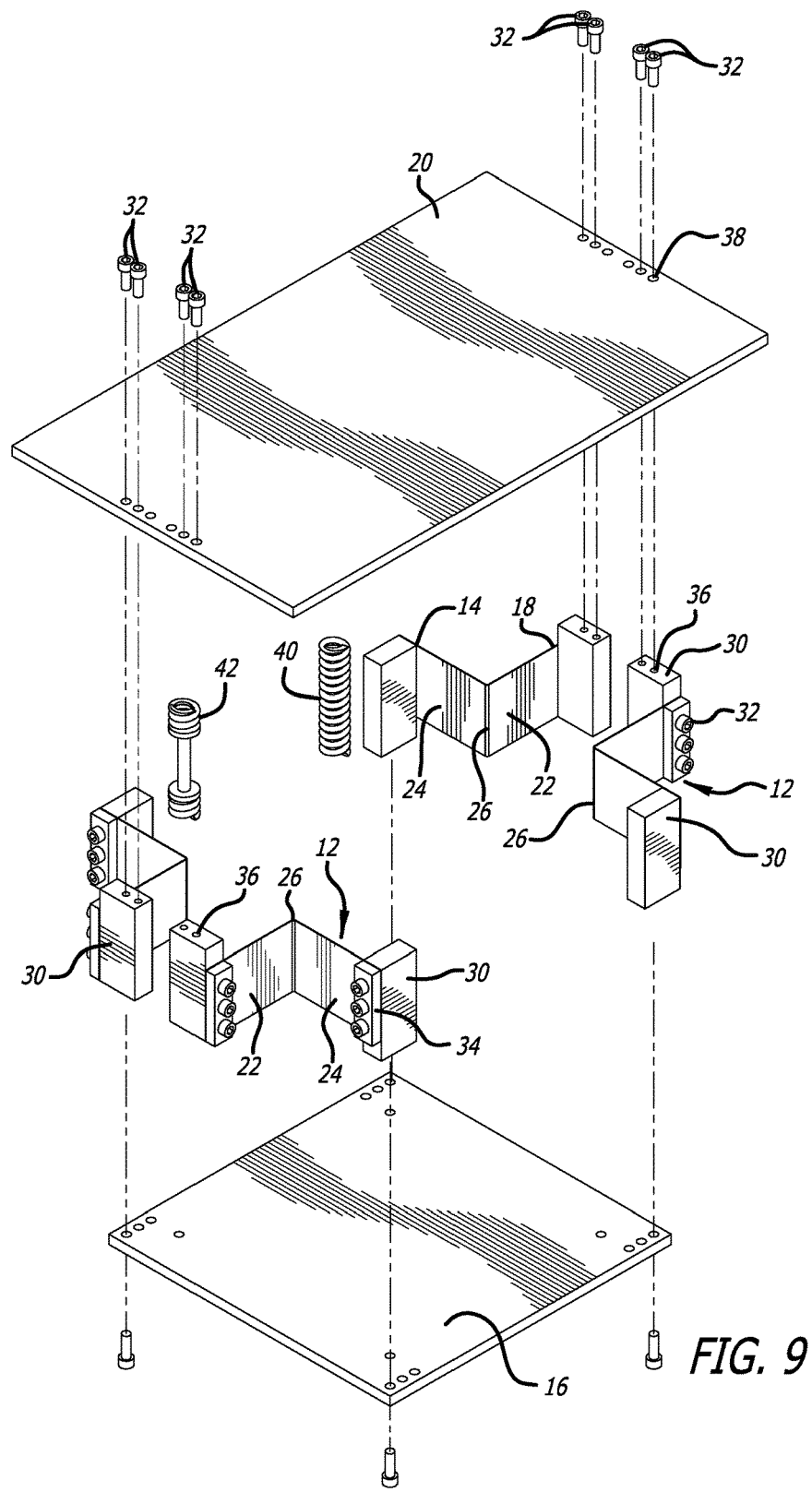
FIG. 9 is an exploded view of the vibration isolation system of FIG. 8.
Figure 10:
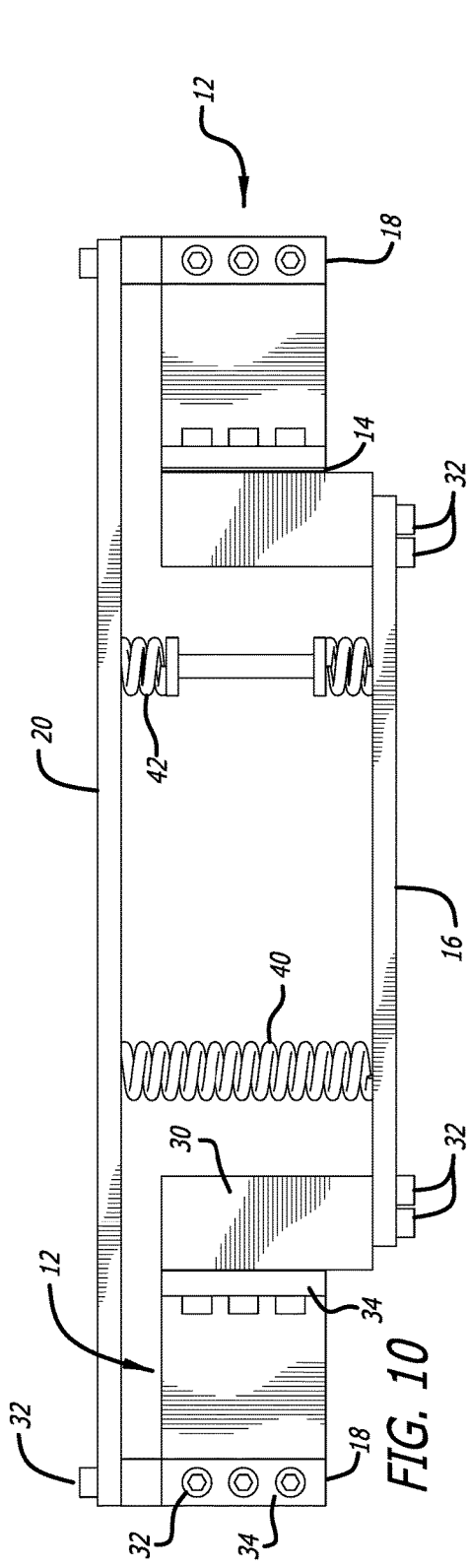
FIG. 10 is a side elevational view showing the vibration isolator system of FIG. 8.
Figure 11:
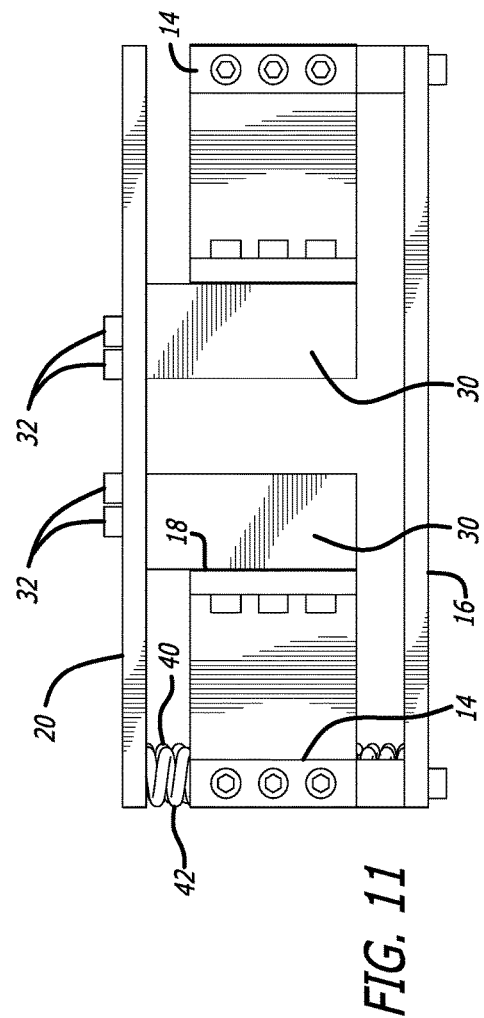
FIG. 11 is another side elevational view showing the vibration isolator system of FIG. 8.

Referring now to FIG. 7, yet another embodiment of a bent flexure 12 is shown. In this particular embodiment, the bent flexure 12 does not have two distinct faces 22, 24, but rather, has a continuous face which forms an S-shaped configuration having a pair of curved bends extending along the horizontal length of the flexure. It should be appreciated that this is just one particular curved configuration that could be used to create a particular bent flexure made in accordance with the present invention. It also should be appreciated that these different variations of the bent flexures may be used simultaneously in creating the composite isolator, i.e., different configurations of the bent flexures could be used together to form the isolator. For example, the embodiment of the bent flexure shown in FIG. 6 could be used with the embodiments shown in FIGS. 1-5. However, generally, it may be easier to manufacture an isolator using bent flexures having the same size and shape.

In the embodiment of the isolator disclosed in FIGS. 1-5, four individual bent flexures 12 are utilized to cooperatively support the payload. However, as few as three bent flexures aligned in parallel may be used to create the horizontal-motion isolator. However, there is no upper limit on the number of bent flexures that may be used in parallel to create the composite isolator.

FIGS. 8-11 show another embodiment of a compact horizontal-motion isolator 10 made in accordance with the present invention. The embodiment of the horizontal-motion isolator 10 of FIGS. 8-11 is similar to the one depicted in FIGS. 1-5 except for the addition of a pair of pre-compressed springs or spring-like elements 40, 42 which are attached to the top mounting plate 20 and the base platform 16. Without the payload weight, or with a payload weight smaller than the spring load, the bent flexures are loaded upward in shear. The upward load applied to the bent flexures is limited by the buckling strength of the bent flexures, which is the same for upward load on the flexures or downward load on the flexures. The maximum upward load on the flexures occurs when there is no payload weight.

The springs or spring-like elements 40, 42 are designed and loaded so that they are near being unstable, right at their instability load, or are unstable so that their horizontal stiffness is small, essentially zero, or is negative, respectively. Also, since the vertical stiffness of the springs or spring-like elements 40, 42 is much lower than that of the bent flexures 12, the horizontal stiffness of the springs or spring-like elements 40, 42 is not changed by changing the downward load on the system from the payload since any change in load on the system is essentially transmitted to the bent flexures 12. In other words, the compressed length of the springs or spring-like elements 40, 42 is essentially fixed by the vertical height (i.e., the vertical length VL) of the vertically stiff bent flexures 12 so the compression load on the springs or spring-like elements 40, 42 does not change by adding or changing payload weight. It should be appreciated that the ends of the springs or spring-like elements 40, 42 could be coupled to the top mounting plate 20 and base platform 16 utilizing standard fastening components (not shown in FIGS. 8-11).

This addition of the compressed springs or spring-like elements 40, 42 to an existing bent-flexure isolation system enables an increased payload by essentially a factor of two and a reduction in the natural frequency of the system. The compression of the springs or spring-like elements 40, 42 and the upward load on the bent flexures 12 without a payload can be essentially that of the payload weight limit of the existing isolation system without the springs or spring-like elements. With the compressed springs or spring-like elements 40, 42, the original payload limit can be doubled since application of the original payload reduces the upward load on the bent flexures to essentially zero and doubling the original payload loads the flexures downward to the load caused by the original payload without the compressed springs or spring-like elements. With essentially the same horizontal stiffness of the system from the bent flexures and double the payload weight, the natural frequency of the system is now reduced by approximately a factor of 0.7 or one over the square root of two. With the compressed springs or spring-like elements designed to produce negative stiffness, the natural frequency of the system is further reduced.

Alternatively, for a given payload, this embodiment enables a lower height bent-flexure isolation system or a lower natural frequency system of the same height. By using a pre-compression spring or spring-like element load of half the payload weight, the bent flexures 12 can be designed for a lower height (VL) to handle the reduced buckling load or a lower stiffness for the same height to reduce the natural frequency. With the compressed springs or spring-like elements 40, 42 designed for negative stiffness, the height (VL) or natural frequency can be further reduced.

In this embodiment of the invention, conventional coil springs or various spring-like elements can be utilized. Some examples include: rigid post with small springs at the ends; machined springs with rigid post and springs at ends; rigid post with neoprene bearings at ends which could provide added damping.

The bent flexures making up the present structure can be made from common structural materials such as steel and aluminum alloys, and other structural materials having suitable strength and elastic properties. For example, the bent flexures may be made from suitable structural materials, e.g., plastic, metal, composites, etc. which provide the necessary strength for vertically supporting the payload while still being flexible enough to be loaded to approach the flexures' point of elastic instability. In some aspects of the invention, they can be made of a sheet of material or can be machine out of a solid block of parent material. The horizontal length (HL) and vertical length (VL) can be varied as needed to attain the force supporting capability to support the payload while providing low horizontal frequency. Again, the vertical height or length (VL) of the bent flexure will dictate the overall vertical height of the horizontal-motion isolator that can be created.

While particular forms of the invention have been illustrated and described, it will be apparent that various modifications can be made without departing from the spirit and scope of the invention. Accordingly, it is not intended that the invention be limited, except by the attached claims.

I claim:

1. A vibration isolator having force-supporting capability in a vertical direction configured for supporting an object in an equilibrium position relative to a base platform while suppressing transmission of horizontal vibratory motion between the object and the base platform, comprising:
   a base platform;
   a top mounting plate for supporting the object;
   a plurality of bent flexures, each bent flexure having a fixed end coupled to the base platform and a floating end coupled to the top mounting plate so that each bent flexure is cantilevered and loaded in shear by the object being supported by the mounting plate and each bent flexure being constrained to bend only in a horizontal direction.

2. The vibration isolator of claim 1, further including at least one compressed spring mounted between the top mounting plate and the base platform.

3. The vibration isolator of claim 1, further including a plurality of compressed springs mounted between the top mounting plate and the base platform.

4. The vibration isolator of claim 1, wherein each bent flexure has low horizontal stiffness and a high vertical stiffness and a high buckling load.

5. The vibration isolator of claim 1, wherein at least one of the bent flexures has a first face, a second face and the bend disposed between the first face and second face.

6. The vibration isolator of claim 1, wherein the first face and second face of each bent flexure are disposed relative to each other so as to form a right angle.

7. The vibration isolator of claim 1, wherein at least one of the bent flexures has an S-shaped configuration.

8. The vibration isolator of claim 1, wherein the floating end of the bent flexures is separated from the fixed end of the bent flexures in the payload direction by a distance that does not vary after the object is positioned on the top mounting plate.

9. The vibration isolator of claim 1, wherein the plurality of bent flexures are suspended between the top mounting plate and the base platform.

10. A vibration isolator having force-supporting capability in a vertical direction configured for supporting an object in an equilibrium position relative to a base platform while suppressing transmission of horizontal vibratory motion to the object, comprising:
    a top mounting plate for supporting the object to be isolated;
    a base platform;
    at least three bent flexures configured to cooperatively support the object to be isolated in the equilibrium position, each bent flexure having a fixed end coupled to the base platform and a floating end coupled to the top mounting plate, each bent flexure being loaded in shear by the weight of the object to be isolated and cantilevered from the fixed end, wherein each bent flexure being constrained to bend only in a horizontal direction.

11. The vibration isolator of claim 10, further including at least one compressed spring having one end coupled to the top mounting plate and one end coupled to the base platform.

12. The vibration isolator of claim 10, further including a plurality of compressed springs, each spring having one end coupled to the top mounting plate and one end coupled to the base platform.

13. The vibration isolator of claim 10, wherein each bent flexure has low horizontal stiffness and a high vertical stiffness and a high buckling load.

14. The vibration isolator of claim 10, wherein at least one of the bent flexures has a first face, a second face and the bend disposed between the first face and second face.

15. The vibration isolator of claim 14, wherein the bend defines a bend axis which is parallel to the direction of the payload.

16. The vibration isolator of claim 14, wherein the first face and second face of each bent flexure are disposed relatively perpendicular to each other.

17. The vibration isolator of claim 10, wherein at least one of the bent flexures has an S-shaped configuration.

18. The vibration isolator of claim 10, further including a mounting assembly for coupling each bent flexure to the base platform.

19. A method for achieving horizontal-motion isolation between a payload to be isolated and a base, comprising:
- providing a plurality of bent flexures, each bent flexure having a fixed end and a floating end;
- coupling the fixed end of each bent flexure to a base; and
- coupling the payload to the floating end of each bent flexure allowing the floating end of each bent flexure to be cantilevered and loaded in shear by the weight of the payload and each bent flexure being constrained to bend only in a horizontal direction.

20. The method of claim 19, wherein the weight of the payload defines a payload direction and each bent flexure is constrained to bend only in a direction traverse to the payload direction.

* * * * *